United States Patent
Hayashi et al.

(10) Patent No.: US 8,910,538 B2
(45) Date of Patent: Dec. 16, 2014

(54) ROBOT

(75) Inventors: Yusuke Hayashi, Kitakyushu (JP);
Manabu Okahisa, Kitakyushu (JP);
Keisuke Yonehara, Kitakyushu (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 147 days.

(21) Appl. No.: 13/359,503

(22) Filed: Jan. 27, 2012

(65) Prior Publication Data

US 2012/0198955 A1 Aug. 9, 2012

(30) Foreign Application Priority Data

Feb. 4, 2011 (JP) ................................ 2011-023082

(51) Int. Cl.
*B25J 17/02* (2006.01)
*B25J 18/00* (2006.01)
*B25J 9/04* (2006.01)
*B25J 9/00* (2006.01)

(52) U.S. Cl.
CPC ................ *B25J 9/046* (2013.01); *B25J 9/0009* (2013.01); *Y10S 901/27* (2013.01); *Y10S 901/28* (2013.01)
USPC ............................. 74/490.05; 901/27; 901/28

(58) Field of Classification Search
USPC ................. 74/490.01–490.06; 908/27, 28, 29
See application file for complete search history.

(56) References Cited

U.S. PATENT DOCUMENTS

| 4,626,165 | A | * | 12/1986 | Nakashima et al. | 414/735 |
| 4,732,526 | A | * | 3/1988 | Nakashima et al. | 414/730 |
| 5,293,107 | A | | 3/1994 | Akeel | |
| 5,375,480 | A | * | 12/1994 | Nihei et al. | 74/490.02 |
| 2006/0182595 | A1 | * | 8/2006 | Lundstrom et al. | 414/695.8 |
| 2007/0062328 | A1 | * | 3/2007 | Shiraishi et al. | 74/594.1 |
| 2011/0112687 | A1 | * | 5/2011 | Long | 700/264 |
| 2012/0266712 | A1 | * | 10/2012 | Oka et al. | 74/490.05 |

FOREIGN PATENT DOCUMENTS

| CN | 101272886 | 9/2008 |
| DE | 19509050 | 9/1996 |
| EP | 1930129 | 6/2008 |
| JP | 2003-275977 | 9/2003 |
| JP | 2006-055936 | 3/2006 |
| JP | 2007-151361 | 6/2007 |
| JP | 2008-272874 | 11/2008 |
| JP | 2010-094749 | 4/2010 |

OTHER PUBLICATIONS

Japanese Office Action for corresponding JP Application No. 2011-023082, Nov. 13, 2012.

(Continued)

*Primary Examiner* — Troy Chambers
*Assistant Examiner* — Emily Cheng
(74) *Attorney, Agent, or Firm* — Mori & Ward, LLP

(57) ABSTRACT

A robot according to an embodiment includes a base, a first structure, a second structure, and a third structure. The first structure is connected to the base to be rotatable about a first axis. The second structure is connected to the first structure to be rotatable about a second axis orthogonal to the first axis. The third structure is connected to the second structure to be rotatable about a third axis parallel to the second axis. The first structure and the third structure are formed by using cast materials having a same shape.

19 Claims, 6 Drawing Sheets

(56) References Cited

OTHER PUBLICATIONS

"Robots KR 1000 titan, KR 1000 L750 with "F" variants—Specification", KUKA Roboter GmbH, Nov. 16, 2010, pp. 1-65, XP-002670134.

"Specification—Robots KR 6, KR 16, KR 16 L6, KR 16 S", KUKA Roboter GmbH, Jun. 9, 2003, pp. 1-47, XP-002670135.
Extended European Search Report for corresponding EP Application No. 12150031.8-2316, Mar. 7, 2012.
Chinese Office Action for corresponding CN Application No. 201210001138.4, Aug. 4, 2014.

* cited by examiner

ROBOT

CROSS-REFERENCE TO RELATED APPLICATION

This application is based upon and claims the benefit of priority from the prior Japanese Patent Application No. 2011-23082, filed on Feb. 4, 2011, the entire contents of which are incorporated herein by reference.

FIELD

The embodiment discussed herein is directed to a robot.

BACKGROUND

Recently, in industrial applications and service applications, applications of so-called multi-joint robots are expanding and various systems of automating high-load and high-cost manual operations by using a robot are proposed.

In order to automate operations, which are conventionally performed manually, in the future responding to further expansion of applications of robots, it is desired to provide a robot that is less expensive and has an appropriate performance sufficiently.

For example, Japanese Patent Laid-open Publication No. 2006-055936 discloses a technology of configuring a robot at a low cost by reducing the weight of the robot by using relatively low-cost and light-weight fiber reinforced resin instead of a general cast material as a structural material.

SUMMARY

A robot according to an aspect of an embodiment includes a base, a first structure, a second structure, and a third structure. The first structure is connected to the base to be rotatable about a first axis. The second structure is connected to the first structure to be rotatable about a second axis orthogonal to the first axis. The third structure is connected to the second structure to be rotatable about a third axis parallel to the second axis. The first structure and the third structure are formed by using cast materials having a same shape.

As used herein, "orthogonal" is not limited to a mathematical sense and thus is meant to allow a reasonable error.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF EMBODIMENT

Hereinafter, an embodiment is explained.

Figure 1:
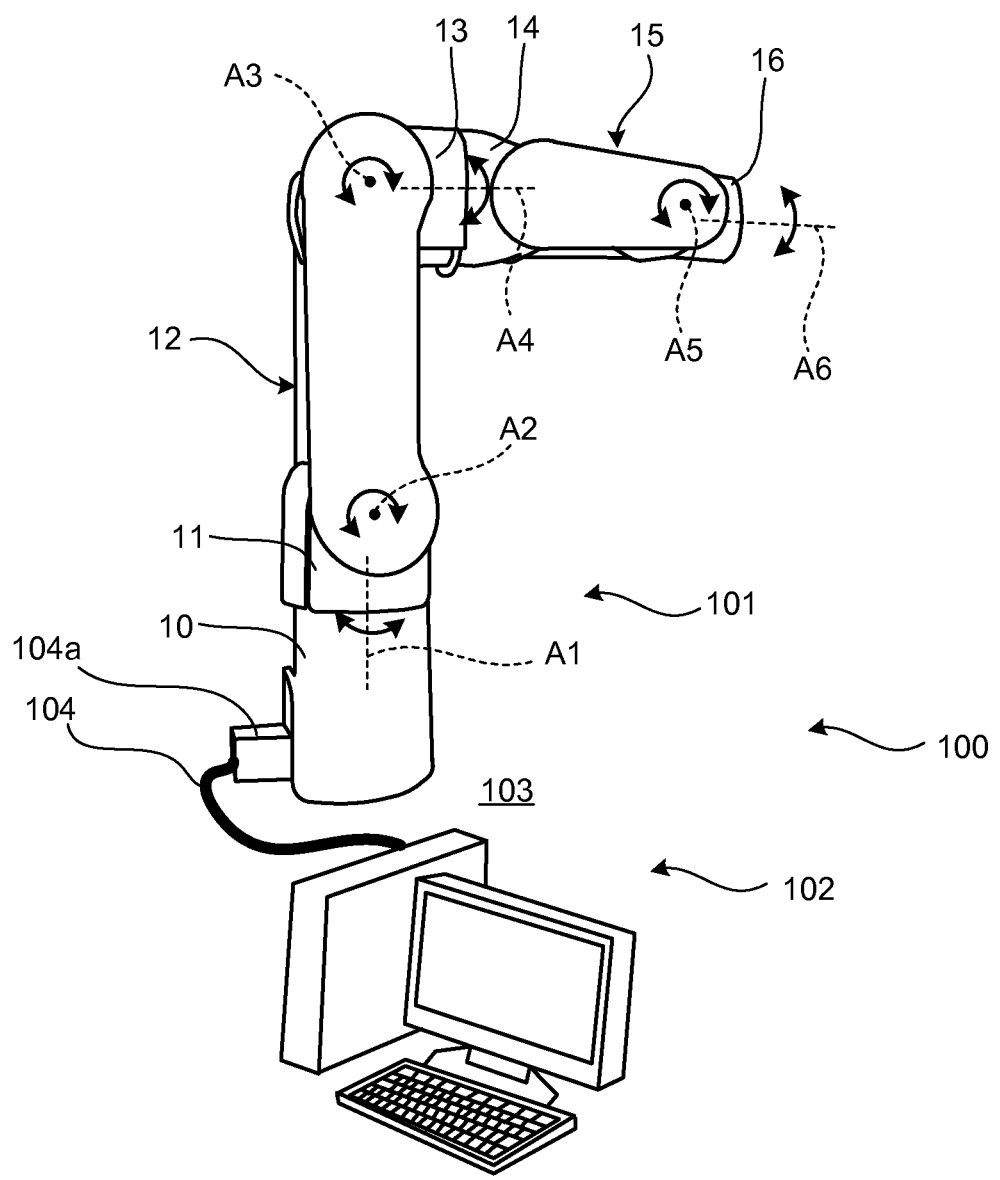
FIG. 1 is a schematic diagram illustrating an overall configuration of a robot system according to an embodiment.

As shown in FIG. 1, a robot system 100 according to the embodiment includes a robot 101 and a controller 102.

The robot 101 includes a base 10, a first structure 11, a second structure 12, a third structure 13, a fourth structure 14, a fifth structure 15, and a sixth structure 16 as structures in the order from an installation surface 103 (base end) to the tip end of the robot 101.

In the lower portion of the base 10, a cable connector 104a for connecting a cable 104 is connected, and the cable 104 is connected to the controller 102 and a not-shown power supply.

In the present embodiment, a general-purpose computer is applied as the controller 102 for configuring at a lower cost, and an operation of each actuator to be described later mounted on the robot 101 is controlled based on an instruction from the controller 102.

The controller 102 is not limited to a general-purpose computer and other computing devices, such as a dedicated robot controller and a servo controller may, of course, be used.

Figure 2:
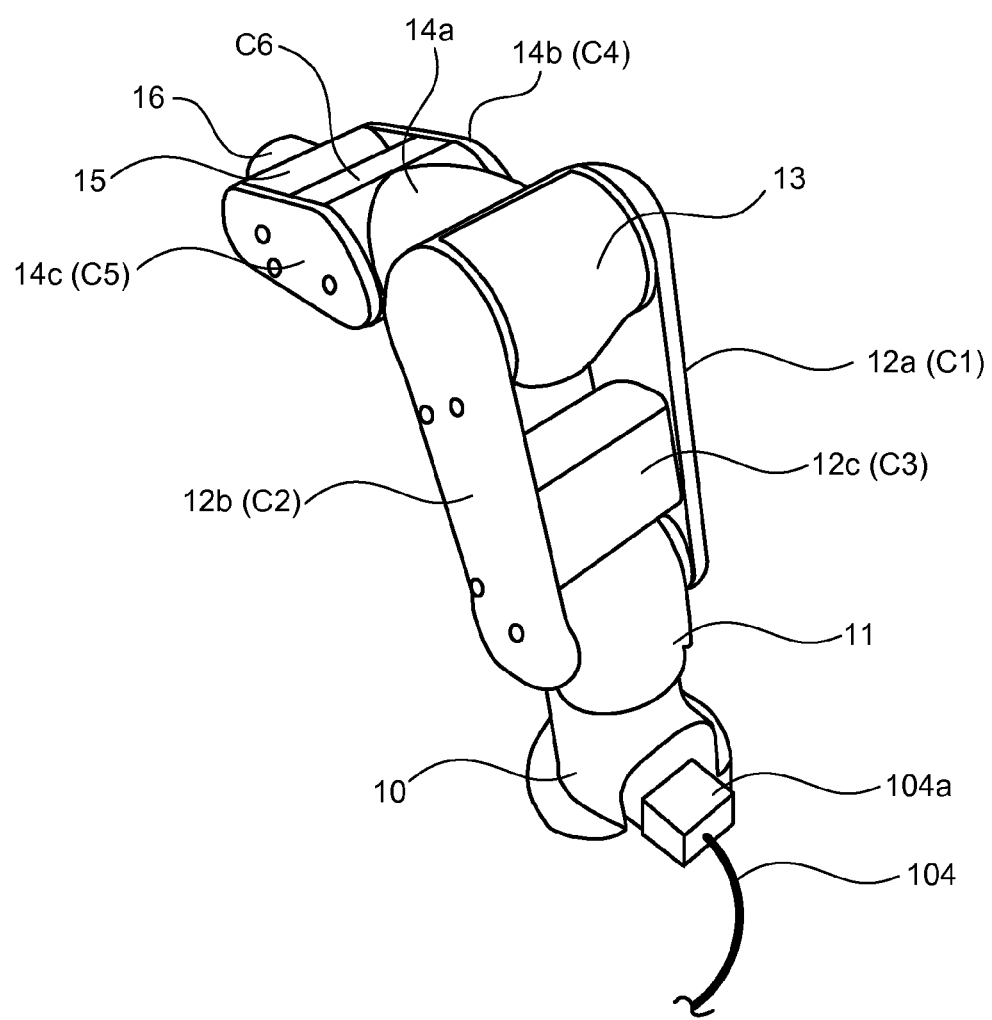
FIG. 2 is a perspective view schematically illustrating an appearance configuration of a robot according to the embodiment.

The connection configuration of the structures 10 to 16 and the movable configuration of each of the structures 10 to 16 are explained. As shown in FIG. 1 and FIG. 2, the base 10 is fixed to the installation surface 103 with not-shown anchor bolts. The first structure 11 is connected to the base 10 to be rotatable about a first axis A1 substantially vertical to the installation surface 103.

Figure 3:
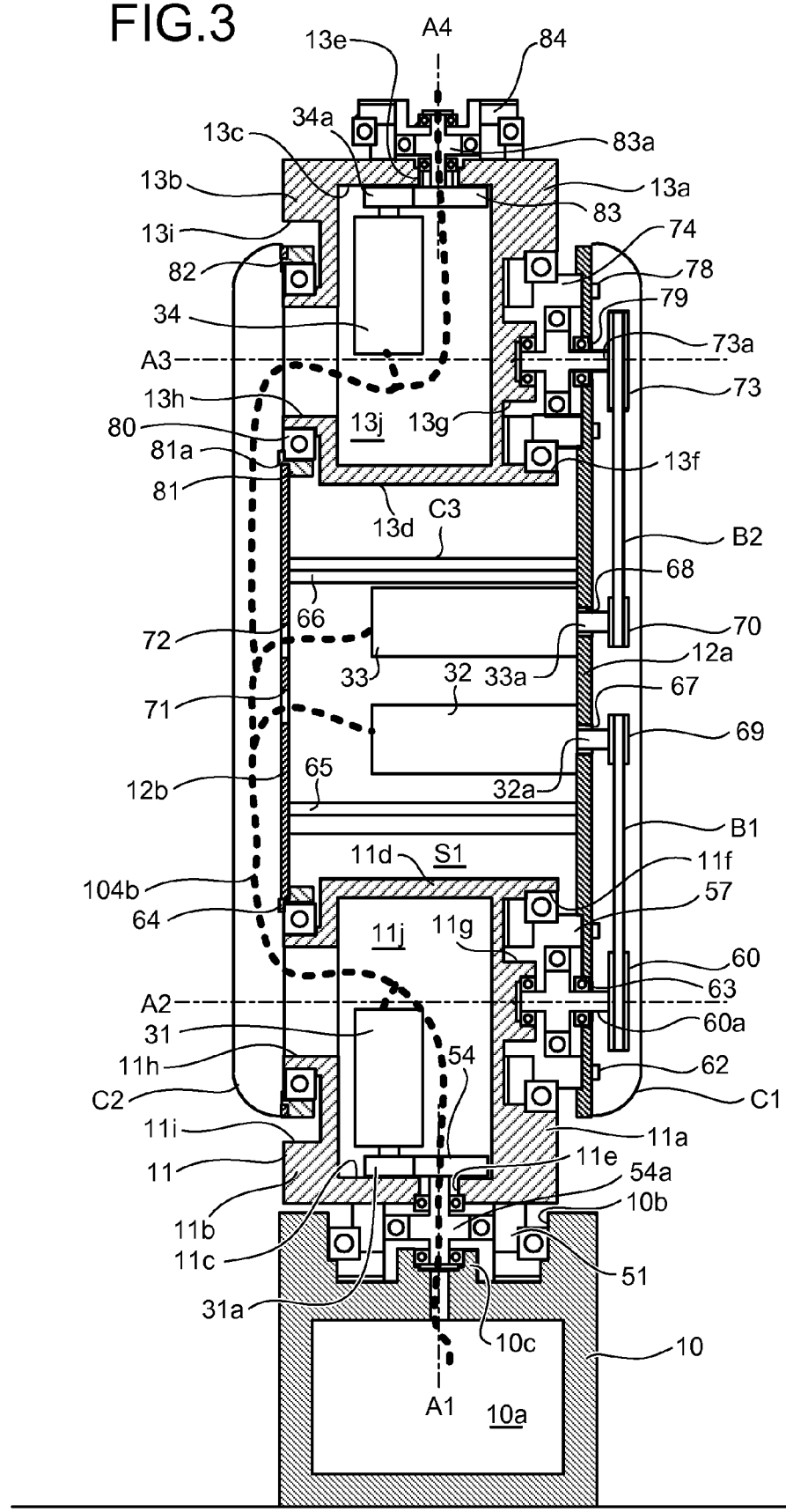
FIG. 3, FIG. 4, and FIG. 6 are schematic cross-sectional views for explaining a partial configuration of the robot according to the embodiment.

As shown also in FIG. 3, the second structure 12 includes a main structural part 12a, an auxiliary structural part 12b, and a connection part 12c. The main structural part 12a and the auxiliary structural part 12b are provided with an interval therebetween. Each of the main structural part 12a and the auxiliary structural part 12b is connected to the first structure 11 at the base end side to be rotatable about a second axis A2 orthogonal to the first axis A1. The connection part 12c is connected to the main structural part 12a and the auxiliary structural part 12b at both ends.

The third structure 13 is provided on the tip end sides of the main structural part 12a and the auxiliary structural part 12b to be sandwiched between the main structural part 12a and the auxiliary structural part 12b. The third structure 13 is connected to each of the main structural part 12a and the auxiliary structural part 12b to be rotatable about a third axis A3 parallel to the second axis A2.

The fourth structure 14 includes a fourth structure base part 14a, a first structural part 14b, and a second structural part 14c. Each base end side of the first structural part 14b and the second structural part 14c is connected to the fourth structure base part 14a to sandwich the fourth structure base part 14a.

The fifth structure 15 is provided on the tip end sides of the first structural part 14b and the second structural part 14c to be sandwiched between the first structural part 14b and the second structural part 14c. The fifth structure 15 is connected to each of the first structural part 14b and the second structural part 14c to be rotatable about a fifth axis A5 orthogonal to the fourth axis A4.

The sixth structure 16 is connected to the fifth structure 15 to be rotatable about a sixth axis A6 orthogonal to the fifth axis A5.

The sixth structure 16 is provided with a not-shown engaging portion and various end effectors, such as a gripper and a torch, can be attached via the engaging portion.

As used herein, "orthogonal" is not limited to a mathematical sense and thus is meant to allow a reasonable error.

Each configuration of the structures 10 to 16 is explained in detail. As shown in FIG. 3, the base 10 is integrally molded of a cast material such as metal and a hollow portion 10a capable of storing a cable harness 104b is formed in the base 10.

A first cylindrical portion 10b projected in a cylindrical shape is formed on the tip end side of the base 10. On the inner side of the first cylindrical portion 10b, a second cylindrical portion 10c concentric with the first cylindrical portion 10b is formed. Bearing members of a harmonic drive 51 are fit into the inner walls of the first cylindrical portion 10b and the second cylindrical portion 10c.

Figure 4:
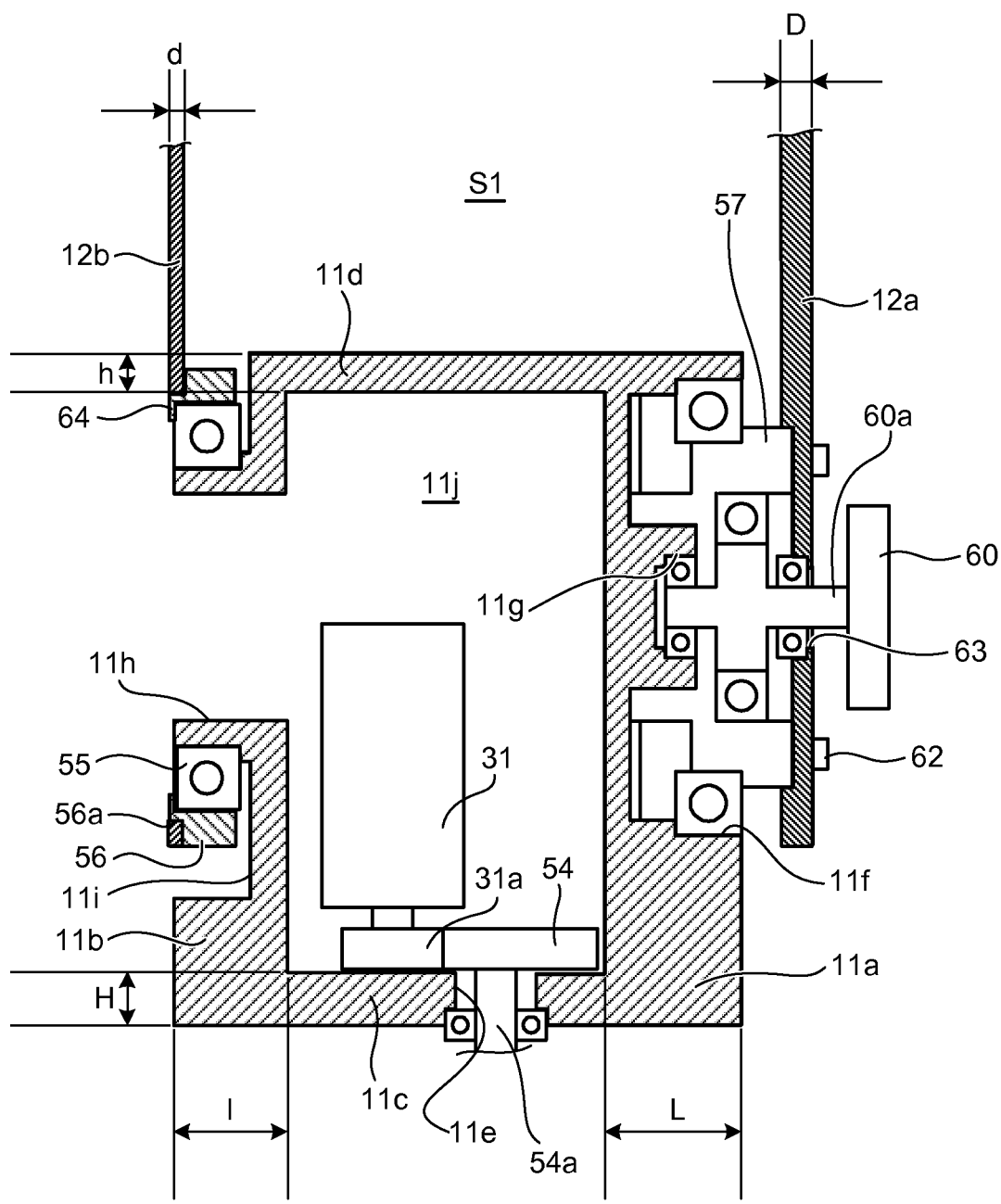

Moreover, as shown in FIG. 3 and FIG. 4, the first structure 11 is a metal cast material and a space 11j capable of storing a not-shown distribution cable and an actuator 31 is formed in the first structure 11.

The actuator 31 is composed of, for example, a servo motor arranged in the space 11j and an output shaft 31a thereof meshes with a gear 54.

A shaft 54a of the gear 54 extends along the first axis A1 and is connected to the input portion of the harmonic drive 51.

In other words, the first structure 11 rotates about the first axis A1 with respect to the base 10 via the harmonic drive 51 by rotationally driving the actuator 31.

The shape of the first structure 11 is explained in more detail. The first structure 11 includes a one-side wall portion 11a with a metal thickness L and an other-side wall portion 11b with a metal thickness l (L>l) facing the one-side wall portion 11a. Moreover, the first structure 11 includes a bottom portion 11c with a metal thickness H continuous with the one-side wall portion 11a and the other-side wall portion 11b and a ceiling portion 11d with a metal thickness h (H>h) that faces the bottom portion 11c and is continuous with the one-side wall portion 11a and the other-side wall portion 11b. As described above, the space 11j capable of storing the cable harness 104b, the actuator 31, and the like is formed between the one-side wall portion 11a and the other-side wall portion 11b.

Moreover, a hole 11e, through which the shaft 54a of the gear 54 can be inserted, is provided in the bottom portion 11c and the bearing member of the harmonic drive 51 is fit into this hole 11e. The gear 54 and the shaft 54a are hollow and the cable harness 104b is routed through the hollows from the hollow portion 10a of the base 10 to the space 11j of the first structure 11.

A cutout portion 11f cut into a cylindrical shape is formed on the outside (opposite side of the space 11j) of the one-side wall portion 11a. A cylindrical portion 11g having a concentric cylindrical shape projects on the inner side of the cylindrical shape of the cutout portion 11f.

Bearing members of a harmonic drive 57 are fit into the inner walls of the cutout portion 11f and the cylindrical portion 11g, respectively.

The output portion of the harmonic drive 57 and the main structural part 12a of the second structure 12 are joined by a plurality of bolts 62. A hole 63, into which a shaft 60a of a pulley 60 can be inserted, is provided in the main structural part 12a and the shaft 60a is connected to the input portion of the harmonic drive 57.

In the other-side wall portion 11b, a thinned recess portion 11i is formed and a bearing hole 11h, which projects in a cylindrical shape from the recess portion 11i and through which the space 11j communicates with the outside, is formed.

A bearing member 55 is attached to the outside of the bearing hole 11h and a metallic thick auxiliary member 56 having a ring (cylindrical) shape is attached to the outside of the bearing member 55.

The auxiliary structural part 12b of the second structure 12 is joined to the thick auxiliary member 56. More specifically, a ring-shaped cutout portion 56a is provided in the thick auxiliary member 56 and a connection hole 64 for connection corresponding to the shape of the cutout portion 56a is provided in the auxiliary structural part 12b. The cutout portion 56a is fit into the connection hole 64 and adhesive is applied between the cutout portion 56a and the connection hole 64. In other words, the cutout portion 56a and the connection hole 64 are bonded to each other without welding.

Therefore, the main structural part 12a and the auxiliary structural part 12b rotate about the second axis A2 with respect to the first structure 11 via the harmonic drive 57 by rotationally driving an actuator 32.

The main structural part 12a of the second structure 12 is formed of a steel plate (rolled steel plate in the present embodiment) as a standard product and has a thickness (thickness length) D in a plate thickness direction. On the other hand, the auxiliary structural part 12b is also a rolled steel plate that is a standard product in the similar manner to the main structural part 12a, however, has a length d (D>d) in a plate thickness direction. The main structural part 12a and the auxiliary structural part 12b are provided to extend in parallel from the first structure 11 to the third structure 13 and a gap S1 is present between the main structural part 12a and the auxiliary structural part 12b.

Figure 5:
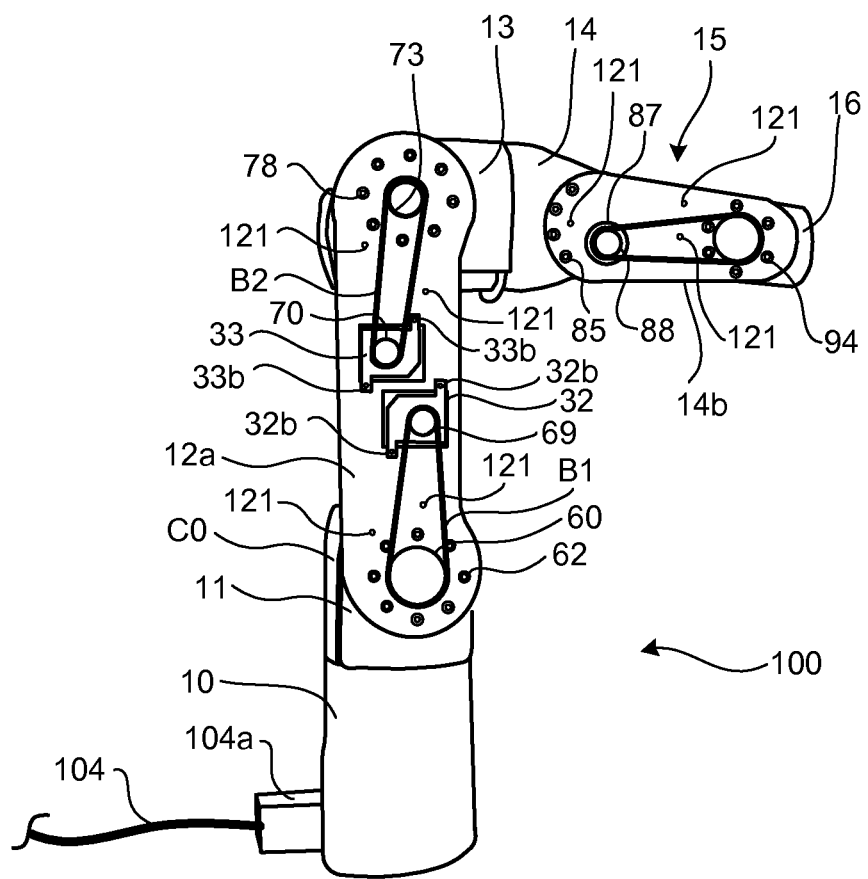
FIG. 5 is a schematic perspective view illustrating a state where covers of the robot according to the embodiment are removed.

As shown in FIG. 5, a plurality of cover bases 121 is attached to the outer surfaces (surfaces on the opposite side of the gap S1) of the main structural part 12a and the auxiliary structural part 12b and resin covers C1 and C2 are attached to the cover bases 121 of the main structural part 12a and the auxiliary structural part 12b, respectively.

Beam members (beam members 65 and 66) are provided as structural reinforcement members formed of steel pipes or the like on the base end side and the tip end side, respectively, between the main structural part 12a and the auxiliary structural part 12b.

In the main structural part 12a, a hole 67, into which the actuator 32 can be inserted, is provided and a hole 68, into which an actuator 33 can be inserted, is provided distal to the hole 67. Both the holes 67 and 68 are provided distal to the beam member 65 and proximal to the beam member 66.

The actuator 32 is fit into the hole 67 of the main structural part 12a and is fixed to the main structural part 12a by bolts 32b as shown in FIG. 5. A pulley 69 is attached near the tip end of an output shaft 32a of the actuator 32. The actuator 33 is fit into the hole 68 of the main structural part 12a and is fixed to the main structural part 12a by bolts 33b. A pulley 70 is attached near the tip end of an output shaft 33a of the actuator 33.

The pulley 69 and the pulley 60 are connected by a belt B1 to be able to transmit a torque and the drive force of the actuator 32 can be transmitted to the pulley 60 via the belt B1. The pulley 70 and a pulley 73 are connected by a belt B2 to be able to transmit a torque and the drive force of the actuator 33 can be transmitted to the pulley 73 via the belt B2.

Cable communication holes 71 and 72, through which the cable harness 104b and the like can communicate, are provided in the auxiliary structural part 12b. Both the two cable communication holes 71 and 72 are provided distal to the beam member 65 and proximal to the beam member 66.

A resin cover C3, which covers the beam members 65 and 66 and the actuators 32 and 33, is attached to the gap S1 to isolate mainly the actuators 32 and 33 from outside.

The third structure 13 is a cast material integrally molded of molten metal to have the same shape as the first structure 11. However, the third structure 13 is attached upside-down with respect to the first structure 11.

In other words, in the similar manner to the first structure 11, the third structure 13 includes a space 13j capable of storing the cable harness 104b and an actuator. Moreover, the third structure 13 includes a one-side wall portion 13a with a metal thickness L and an other-side wall portion 13b with a metal thickness l (L>l) facing the one-side wall portion 13a. Furthermore, the third structure 13 includes a bottom portion 13c with a metal thickness H continuous with the one-side wall portion 13a and the other-side wall portion 13b and a ceiling portion 13d with a metal thickness h (H>h) that faces the bottom portion 13c and is continuous with the one-side wall portion 13a and the other-side wall portion 13b.

A cutout portion 13f cut into a cylindrical shape is formed on the outside (opposite side of the space 13j) of the one-side wall portion 13a. A cylindrical portion 13g having a cylindrical shape, whose center axis is the same as the cutout portion 13f, projects on the inner side of the cylindrical shape of the cutout portion 13f.

Bearing members of a harmonic drive 74 are fit into the inner walls of the cutout portion 13f and the cylindrical portion 13g, respectively.

The main structural part 12a of the second structure 12 is joined to the output portion of the harmonic drive 74 by a plurality of bolts 78. A hole 79, into which a shaft 73a of the pulley 73 can be inserted, is provided in the main structural part 12a and the shaft 73a is connected to the input portion of the harmonic drive 74.

Therefore, the third structure 13 rotates about the third axis A3 with respect to the main structural part 12a and the auxiliary structural part 12b via the harmonic drive 74 by rotationally driving the actuator 33.

In the other-side wall portion 13b, a thinned recess portion 13i is formed and a bearing hole 13h, which projects in a cylindrical shape from the recess portion 13i and through which the space 13j communicates with the outside, is formed.

A bearing member 80 is attached to the outside of the bearing hole 13h and a metallic thick auxiliary member 81 having a ring (cylindrical) shape is attached to the outside of the bearing member 80.

A ring-shaped cutout portion 81a is provided in the thick auxiliary member 81 and a connection hole 82 for connection corresponding to the shape of the cutout portion 81a is provided in the auxiliary structural part 12b. The cutout portion 81a is fit into the connection hole 82 and adhesive is applied between the cutout portion 81a and the connection hole 82, so that the cutout portion 81a and the connection hole 82 are bonded to each other without welding.

Moreover, a hole 13e, through which a shaft 83a of a gear 83 can be inserted, is provided in the bottom portion 13c and the bearing member of a harmonic drive 84 is fit into this hole 13e.

An actuator 34 is composed of, for example, a servo motor arranged in the space 13j and an output shaft 34a thereof meshes with the gear 83.

Figure 6:
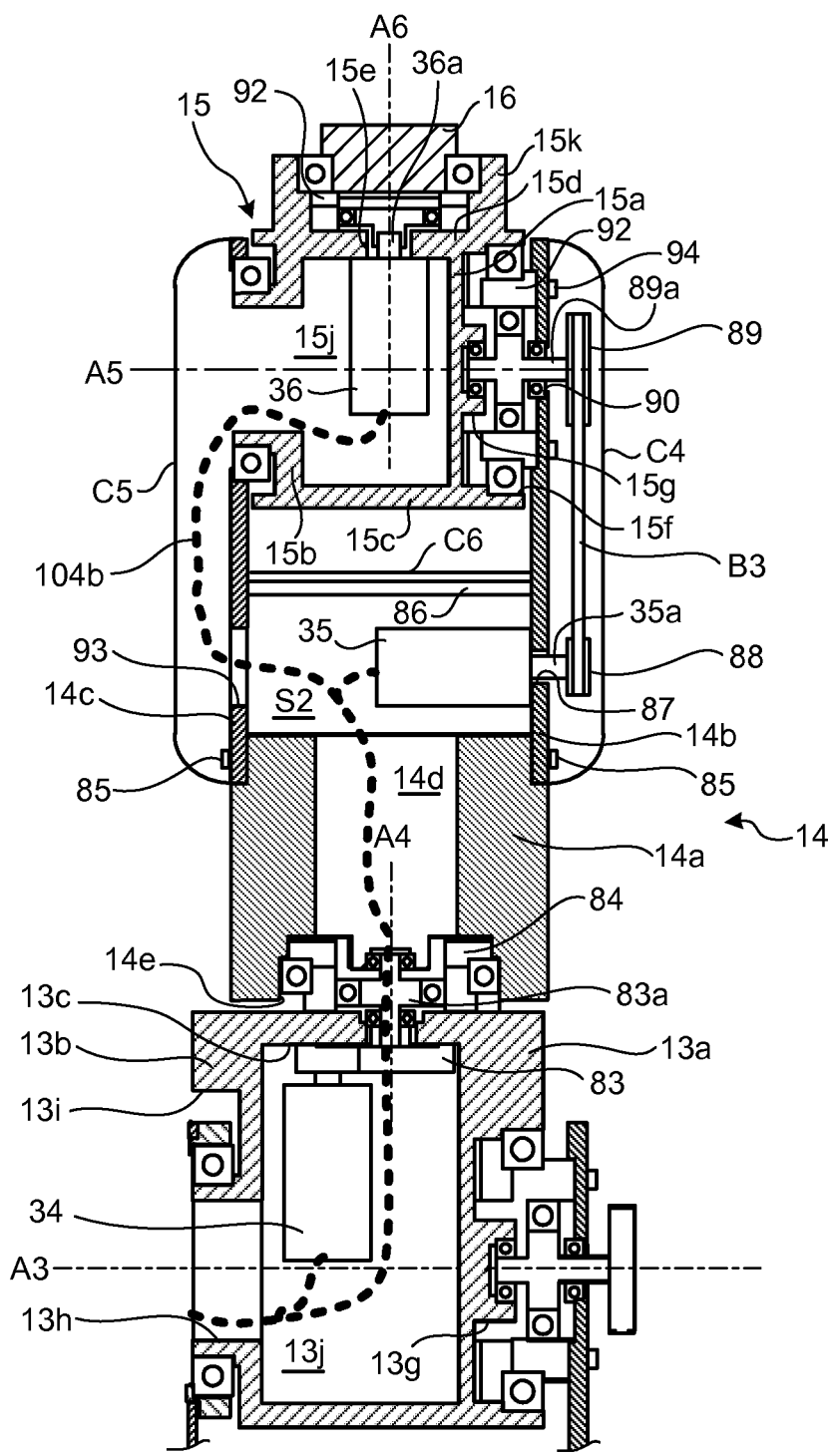

As shown in FIG. 6, the fourth structure 14 includes the fourth structure base part 14a formed of a metal cast material, and the first structural part 14b and the second structural part 14c joined to the fourth structure base part 14a by a plurality of bolts 85.

A space 14d capable of storing the cable harness 104b and a cylindrical portion 14e cut into a cylindrical shape are formed in the fourth structure base part 14a and the bearing member of the harmonic drive 84 is fit into the inner wall side of the cylindrical portion 14e.

The gear 83 and the shaft 83a are hollow and the cable harness 104b is routed through the hollow portions from the space 13j to the space 14d of the fourth structure base part 14a.

Therefore, the fourth structure 14 rotates about the fourth axis A4 with respect to the third structure 13 via the harmonic drive 84 by rotationally driving the actuator 34.

The first structural part 14b and the second structural part 14c are formed of rolled steel plates that are standard products having the same plate thickness, and the plate thickness (thickness length) thereof is set smaller than the plate thickness D of the main structural part 12a of the second structure 12.

The first structural part 14b and the second structural part 14c are provided to extend in parallel from the fourth structure base part 14a to the fifth structure 15 and a gap S2 is present between the first structural part 14b and the second structural part 14c.

As shown in FIG. 5, a plurality of the cover bases 121 is attached to the outer surfaces (surfaces on the opposite side of the gap S2) of the first structural part 14b and the second structural part 14c and resin covers C4 and C5 are attached to the cover bases 121 of the first structural part 14b and the second structural part 14c, respectively.

A beam member 86 is provided as a structural reinforcement member formed of a steel pipe or the like between the first structural part 14b and the second structural part 14c.

A hole 93, through which the cable harness 104b can communicate, is provided in the second structural part 14c.

A resin cover C6, which covers the beam member 86 and an actuator 35, is attached to the gap S2 to isolate mainly the actuator 35 from outside.

A hole 87, into which an output shaft 35a of the actuator 35 can be inserted, is provided in the first structural part 14b. The actuator 35 is fit into the hole 87 of the first structural part 14b and a pulley 88 is attached to the tip end of the output shaft 35a.

Moreover, a hole 90, into which a shaft 89a of a pulley 89 can be inserted, is provided distal to the hole 87. The pulley 88 and the pulley 89 are connected by a belt B3 to be able to transmit a torque and the drive force of the actuator 35 can be transmitted to the pulley 89 via the belt B3.

The fifth structure 15 is formed of a metal cast material and is formed to be smaller and lighter than the first structure 11 and the third structure 13.

In the similar manner to the first structure 11 and the third structure 13, the fifth structure 15 includes a space 15j capable of storing the cable harness 104b and an actuator.

The fifth structure 15 includes a one-side wall portion 15a, an other-side wall portion 15b facing the one-side wall portion 15a, a ceiling portion 15d continuous with the one-side wall portion 15a and the other-side wall portion 15b, and a bottom portion 15c that faces the ceiling portion 15d and is continuous with the one-side wall portion 15a and the other-side wall portion 15b. An actuator 36 is arranged in the space 15j. A hole 15e, through which an output shaft 36a of the actuator 36 can be inserted, is provided in the ceiling portion 15d and a cylindrical portion 15k having a cylindrical shape is formed on the outside (opposite side of the space 15j) of the ceiling portion 15d. Bearing members of a harmonic drive 92 are fit into the hole 15e and the cylindrical portion 15k, respectively. The output side of the harmonic drive 92 is connected to the sixth structure (flange) 16 to be integrally rotatable.

A cutout portion 15f cut into a cylindrical shape is formed on the outside (opposite side of the space 15j) of the one-side wall portion 15a. A cylindrical portion 15g having a concentric cylindrical shape projects on the inner side of the cylindrical shape of the cutout portion 15f.

The bearing members of the harmonic drive 92 are fit into the inner walls of the cutout portion 15f and the cylindrical portion 15g, respectively, the input portion of the harmonic drive 92 is connected to the shaft 89a of the pulley 89, and the output side of the harmonic drive 92 is connected to the first structural part 14b by a plurality of bolts 94.

In other words, the fifth structure 15 rotates about the fifth axis A5 with respect to the fourth structure 14 via the harmonic drive 92 by rotationally driving the actuator 35.

Moreover, the sixth structure 16 rotates about the sixth axis A6 with respect to the fifth structure 15 via the harmonic drive 92 by rotationally driving the actuator 36.

The sixth structure 16 is formed of steel or the like to have a disk shape and an engaging portion (not shown) capable of attaching an end effector, such as a robot hand, is formed on the surface on the tip end side.

The robot 101 according to the present embodiment is configured as above, and the first structure 11 and the third structure 13 are formed by using cast materials having the same shape. Therefore, the number of customized parts can be reduced and the cost can be reduced through mass-production of cast materials having the same shape by standardizing parts.

Moreover, in the robot 101 according to the present embodiment, the main structural part 12a and the auxiliary structural part 12b of the second structure 12 and the first structural part 14b and the second structural part 14c of the fourth structure 14, which are relatively long, are formed by using a standardized steel plate that can be obtained at a low price. Consequently, the effect of significantly reducing the cost can be expected by dramatically reducing the number of customized parts such as a cast material.

When a standardized steel plate is used as the structural members, advantages, such as providing a rib or a thick portion according to an assumed stress (specially, twist direction or the like), obtained when using customized parts each having an optimized shape cannot be obtained. In regard to this point, in the present embodiment, the main structural part 12a having a relatively large thickness and the auxiliary structural part 12b, which is thinner and lighter than the main structural part 12a, are used to be arranged in parallel, so that the structural members can be reduced in weight and the rigidity of the structural members in the twist direction can be improved.

Furthermore, in the present embodiment, the actuator 32 and the actuator 33, which are relatively heavy, are arranged to be adjacent to each other in the gap between the main structural part 12a and the auxiliary structural part 12b and are supported only by the main structural part 12a. Consequently, the auxiliary structural part 12b having a smaller thickness can be selected, enabling to further reduce the weight.

On the other hand, in the present embodiment, the thickness of the auxiliary structural part 12b is set small. Therefore, in terms of insufficient engagement margin between the bearing member 55 and the auxiliary structural part 12b, the thick auxiliary member 56 is bonded to the auxiliary structural part 12b, so that sufficient engagement margin can be ensured between the bearing member 55 and the auxiliary structural part 12b. Moreover, in the present embodiment, because the auxiliary structural part 12b and the thick auxiliary member 56 are bonded only with adhesive without welding or using bolts or the like, man-hours required for joining the auxiliary structural part 12b and the thick auxiliary member 56 is reduced. Furthermore, because distortion or residual stress due to welding heat is not generated, the auxiliary structural part 12b can be accurately processed even when the thickness of the auxiliary structural part 12b is set smaller. In this manner, there is an advantage that a low-cost and highly accurate structure can be formed as long as the load capacity required of the robot 101 is within a range that does not exceed the bonding strength of adhesive.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

For example, in the present embodiment, the first structure and the third structure are formed of cast materials having the same shape, however, in addition to the first structure and the third structure, the fifth structure may be also formed by using a cast material having the same shape. At this time, while using a common mold, a structure closer to the tip end side may be formed by using a material having a specific gravity smaller than that of a structure closer to the base end side. For example, the first structure and the third structure may be molded using molds having the same shape, the first structure may be formed by using a material having a relatively high rigidity, and the third structure may be formed by using a material that has a relatively low rigidity and is light compared with the first structure.

Moreover, in the present embodiment, the main structural part and the auxiliary structural part, which are rolled steel plate materials having different thicknesses, are provided as the second structure, however, the main structural part and the auxiliary structural part may be formed of rolled steel plate materials having the same thickness.

Moreover, as a material of a steel plate, various metal steel plates, such as steel, aluminum, and stainless steel may be applied.

What is claimed is:
1. A robot comprising:
a base;
a first structure connected to the base to be rotatable about a first axis;
a second structure connected to the first structure to be rotatable about a second axis orthogonal to the first axis; and
a third structure connected to the second structure to be rotatable about a third axis parallel to the second axis,
each of the first structure and the third structure comprising:
a one-side wall portion; and
an other-side wall portion having a thickness smaller than the one-side wall portion,
the first and third structures being hollow structures,
the one-side and other-side wall portions of the first structure respectively having identical structures as the one-side and other-side wall portions of the third structure,
the second structure comprising:
a plate-like main structural part; and
a plate-like auxiliary structural part that is located opposite to the main structural part at a predetermined interval and has a smaller plate thickness than the main structural part, and
the one-side wall portions of the first and third structures being rotatably connected to the main structural part of the second structure and the other-side wall portions of the first and third structures being rotatably connected to the auxiliary structural part of the second structure.
2. The robot according to claim 1, further comprising at least one actuator whose output shaft penetrates through the main structural part and is supported by the main structural part and which is arranged between the main structural part and the auxiliary structural part.

3. The robot according to claim 2, wherein
a second axis actuator and a third axis actuator are arranged between the main structural part and the auxiliary structural part, as the actuator, and
the robot further includes
a second axis power transmission mechanism capable of performing power transmission between an output shaft of the second axis actuator, which penetrates through the main structural part, and the first structure, and
a third axis power transmission mechanism capable of performing power transmission between an output shaft of the third axis actuator, which penetrates through the main structural part, and the third structure.

4. The robot according to claim 3, further comprising:
a fourth structure connected to the third structure to be rotatable about a fourth axis orthogonal to the third axis;
a fifth structure connected to the fourth structure to be rotatable about a fifth axis orthogonal to the fourth axis; and
a sixth structure connected to the fifth structure to be rotatable about a sixth axis orthogonal to the fifth axis.

5. The robot according to claim 2, further comprising:
a fourth structure connected to the third structure to be rotatable about a fourth axis orthogonal to the third axis;
a fifth structure connected to the fourth structure to be rotatable about a fifth axis orthogonal to the fourth axis; and
a sixth structure connected to the fifth structure to be rotatable about a sixth axis orthogonal to the fifth axis.

6. The robot according to claim 1, further comprising:
a bearing member that rotatably supports the auxiliary structural part and the first structure; and
a thick auxiliary member that is interposed between the bearing member and the auxiliary structural part and compensates for a length of the auxiliary structural part in a plate thickness direction.

7. The robot according to claim 6, wherein
a connection hole for connecting the bearing member is formed in the auxiliary structural part,
the thick auxiliary member includes a cutout portion matching the connection hole, and
the connection hole of the auxiliary structural part and the cutout portion of the thick auxiliary member are bonded with adhesive.

8. The robot according to claim 7, further comprising:
a fourth structure connected to the third structure to be rotatable about a fourth axis orthogonal to the third axis;
a fifth structure connected to the fourth structure to be rotatable about a fifth axis orthogonal to the fourth axis; and
a sixth structure connected to the fifth structure to be rotatable about a sixth axis orthogonal to the fifth axis.

9. The robot according to claim 6, further comprising:
a fourth structure connected to the third structure to be rotatable about a fourth axis orthogonal to the third axis;
a fifth structure connected to the fourth structure to be rotatable about a fifth axis orthogonal to the fourth axis; and
a sixth structure connected to the fifth structure to be rotatable about a sixth axis orthogonal to the fifth axis.

10. The robot according to claim 1, further comprising:
a bearing member that rotatably supports the auxiliary structural part and the third structure; and
a thick auxiliary member that is interposed between the bearing member and the auxiliary structural part and compensates for a length of the auxiliary structural part in a plate thickness direction.

11. The robot according to claim 10, wherein
a connection hole for connecting the bearing member is formed in the auxiliary structural part,
the thick auxiliary member includes a cutout portion matching the connection hole, and
the connection hole of the auxiliary structural part and the cutout portion of the thick auxiliary member are bonded with adhesive.

12. The robot according to claim 11, further comprising:
a fourth structure connected to the third structure to be rotatable about a fourth axis orthogonal to the third axis;
a fifth structure connected to the fourth structure to be rotatable about a fifth axis orthogonal to the fourth axis; and
a sixth structure connected to the fifth structure to be rotatable about a sixth axis orthogonal to the fifth axis.

13. The robot according to claim 10, further comprising:
a fourth structure connected to the third structure to be rotatable about a fourth axis orthogonal to the third axis;
a fifth structure connected to the fourth structure to be rotatable about a fifth axis orthogonal to the fourth axis; and
a sixth structure connected to the fifth structure to be rotatable about a sixth axis orthogonal to the fifth axis.

14. The robot according to claim 1, further comprising:
a fourth structure connected to the third structure to be rotatable about a fourth axis orthogonal to the third axis;
a fifth structure connected to the fourth structure to be rotatable about a fifth axis orthogonal to the fourth axis; and
a sixth structure connected to the fifth structure to be rotatable about a sixth axis orthogonal to the fifth axis.

15. The robot according to claim 1, wherein
the each of the first structure and the third structure further comprises:
a bottom portion that is continuous with the one-side wall portion and the other-side wall portion; and
a ceiling portion that faces the bottom portion and is continuous with the one-side wall portion and the other-side wall portion, and
the bottom and ceiling portions of the first structure respectively having same shapes as the bottom and ceiling portions of the third structure.

16. The robot according to claim 15, wherein the bottom portion has a metal thickness larger than that of the ceiling portion.

17. A robot comprising:
a base;
a first structure connected to the base to be rotatable about a first axis;
a second structure connected to the first structure to be rotatable about a second axis orthogonal to the first axis; and
a third structure connected to the second structure to be rotatable about a third axis parallel to the second axis,
each of the first structure and the third structure comprising:
a one-side wall portion; and
an other-side wall portion having a thickness smaller than the one-side wall portion, the first and third structures being hollow structures,
the first and third structures having identical structures,
the second structure comprising:

a plate-like main structural part; and a plate-like auxiliary structural part that is located opposite to the main structural part at a predetermined interval and has a smaller plate thickness than the main structural part, and the one-side wall portions of the first and third structures being rotatably connected to the main structural part of the second structure and the other-side wall portions of the first and third structures being rotatably connected to the auxiliary structural part of the second structure.

18. The robot according to claim 17, wherein the each of the first structure and the third structure further comprises:

a bottom portion that is continuous with the one-side wall portion and the other-side wall portion; and a ceiling portion that faces the bottom portion and is continuous with the one-side wall portion and the other-side wall portion.

19. The robot according to claim 18, wherein the bottom portion has a metal thickness larger than that of the ceiling portion.

* * * * *